Figure 1:
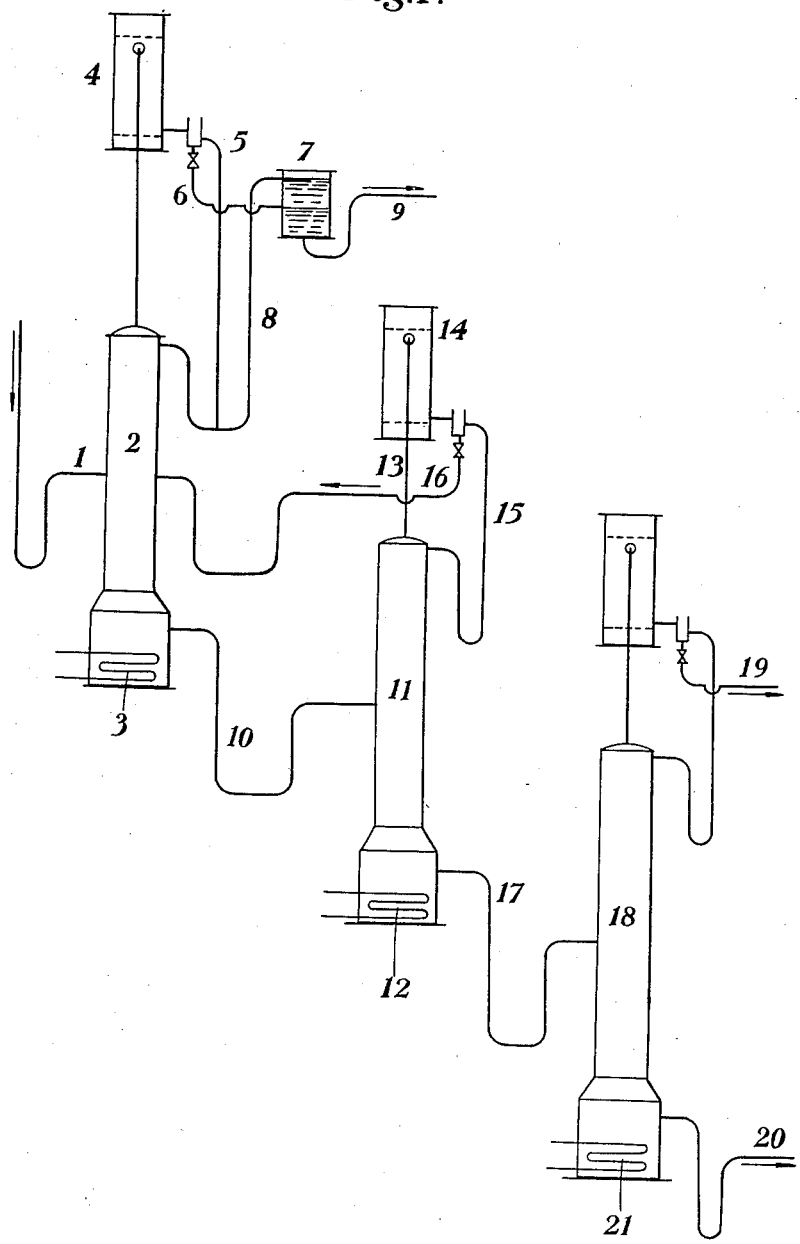

Patented May 23, 1939

2,159,146

UNITED STATES PATENT OFFICE 2,159,146

PROCESS FOR THE SEPARATION OF ACETIC ANHYDRIDE

Henri Martin Guinot, Melle, Deux-Sevres, France, assignor to les Usines de Melle, Melle, Deux-Sevres, France, a company of France Application December 4, 1934, Serial No. 755,995
In France December 12, 1933

4 Claims. (Cl. 202—42)

It is known that it is possible to obtain industrially mixtures of acetic anhydride, acetic acid and water, by pyrogenous dehydration of acetic acid.

Up to the present, to extract the acetic anhydride from these mixtures, recourse was preferably had to distillation under vacuum. This permitted the mixture being raised to slight temperature, so as to diminish as much as possible the speed of decompositon of the acetic anhydride by the water; thus there was separated out as head product water containing a more or less large amount of acid and then acetic acid was recovered at high concentration, the anhydride remaining as tail product. Actually, this separation is far from a really satisfactory procedure, due to the fact that on the one hand the water distilling off as head product carries acid with it, and that on the other hand the acetic acid then passing over is never completely free from water, which fact definitely limits the efficacy of the later pyrogenous dehydration which is carried out afresh upon the acid thus recovered.

Processes of fractional condensation in the presence of hydrocarbons or of chlorinated derivatives, have also been proposed but these processes do not procure any marked improvement over the method of distillation under vacuum which is most in favour industrially.

The present invention has for its subject a process which allows of improving the results obtained hitherto.

This process consists essentially in adding, in large amount, to the mixture to be separated, a solvent insensitive to the reactions that take place, and not giving an azeotropic mixture with either acetic acid or with the anhydride, and having a double effect; first, to lower the boiling point of the mixture, (without which recourse must be had to employment of a vacuum), then to entrain the water by azetropic action without removing either acetic acid or anhydride. It is not until the complete removal of the water has been effected by distillation that the solvent is separated from the mixture; there then remains a residue of anhydrous acetic acid and acetic anhydride, easy to separate into its constituents; industrially, this mixture may, moreover, be used as such, for certain purposes, if need be after partial separation of the acid.

In the case in which it is desired to obtain the pure anhydride, the mixture is fractionated. Thus there is also separated the acid, in a strictly anhydrous condition, such that the later pyrogenation of this recovered acid may be carried out with the maximum of efficiency.

As solvent, it is proposed to use acetic esters, such as ethyl, propyl, or isopropyl acetates, which are without action on the acetic acid and on the anhydride and do not give azetropic mixtures with them.

The step of isolating the acetic anhydride according to the present invention may be effected either continuously or discontinuously. It is, however, preferable to use the continuous method of working, which allows the decomposition of the anhydride to be reduced to a minimum during the course of the operation.

The description which follows with reference to the attached drawings, given by way of example, will make quite clear the manner of carrying out the invention.

Figure 2:
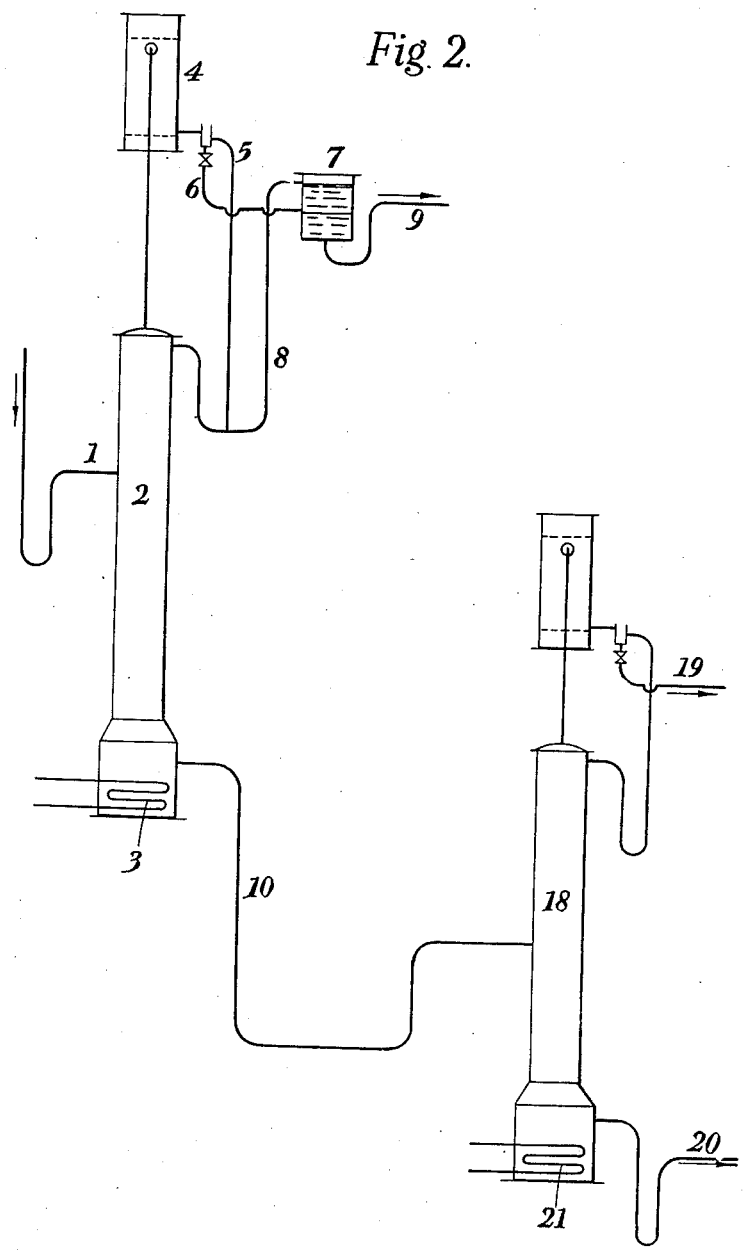

Figures 1 and 2 are two schematic representations of apparatus for carrying out the invention.

Through pipe 1, the distillation column 2, charged once for all with ethyl acetate which constitutes the chosen solvent, and provided at its base with heating means 3, receives the supply of acetic anhydride mixture, acetic acid and water. Upon the introduction of this mixture into the column the temperature at the top of the column tends to drop from 77° to 70.45°, the boiling point of the binary water-ethyl acetate mixture. The binary mixture distils off and is collected in the condenser 4; there it is condensed and the liquid formed is in part sent back by pipe 5 into the column and in part led by pipe 6 into the decanter 7; in the latter it forms two layers; the upper layer rich in ethyl acetate is led in a continuous manner into the column by pipe 8, the other layer being emptied by 9.

Falling from plate to plate, the mixture fed in becomes quickly dehydrated, whilst the decomposition of the acetic anhydride by the water is made very slight by reason of the slightly raised boiling temperature which exists at the different plates, due to the large excess of acetate in relation to the acid and anhydride. The intensity of the heating at the base of the column 2 allows of acting at will on the excess of acetate in relation to the liquid fed in.

Finally, towards the base of the column 2, there is obtained a strictly anhydrous mixture of ethyl acetate, acetic acid and acetic anhydride. This mixture is sent by pipe 10 into a column 11 heated at its base at 12; at the head of column 11 there separates the ethyl acetate which is led by 13 into condenser 14; one part of this body is led back by 15 to column 11 and the other re-enters, by pipe 16, into column 2, which allows the charging of this column to be kept constant. The mixture of acid and anhydride is sent by pipe 17 into a column 18 heated at its base at 21, and which separates the anhydrous acetic acid as a head product (pipe 19) and the acetic anhydride as a tail product (pipe 20).

As shown in Fig. 2, moreover, columns 2 and 11 may be combined in a single column 2'. In Fig. 2 the parts already shown in Fig. 1 have been indicated by the same reference numerals. In this case, it suffices to adjust the quota of ethyl acetate once for all introduced in the apparatus so as to furnish sufficient acetic ester for the whole part of the column in which the dehydration takes place, whilst maintaining a temperature of at least 118° (the boiling temperature of acetic acid) at the base of column 2, which ensures that the mixture contains no ethyl acetate. It is to be understood that the operation may be carried out at a pressure other than atmospheric without departing from the scope of the present invention.

The expression "lower alkyl acetate" as here employed is intended to designate an acetate having an alkyl radical containing less than six carbon atoms, and includes both normal and iso compounds falling thereunder.

What I claim is:

1. A process of the kind described which comprises combining with a mixture of water, acetic acid and acetic anhydride, a lower alkyl acetate, having a boiling point below the boiling point of the acetic acid and anhydride but forming no azeotropic mixture with the acetic acid or anhydride, and heating to remove the azeotropic mixture of water and said acetate.

2. A process for the extraction of an anhydrous mixture of acetic acid and acetic anhydride from a mixture of water, acetic acid and acetic anhydride, comprising distilling the mixture of water, acetic acid and acetic anhydride, with ethyl acetate, and removing the azeotropic mixture of water and ethyl acetate which distils over.

3. A process for the extraction of an anhydrous mixture of acetic acid and acetic anhydride from a mixture of water, acetic acid and acetic anhydride, comprising distilling the mixtures of water, acetic acid and acetic anhydride, with propyl acetate, and removing the azeotropic mixture of water and propyl acetate which distils over.

4. A process for the extraction of an anhydrous mixture of acetic acid and acetic anhydride from a mixture of water, acetic acid and acetic anhydride, comprising distilling the mixture of water, acetic acid and acetic anhydride, with isopropyl acetate, and removing the azeotropic mixture of water and isopropyl acetate which distils over.

HENRI MARTIN GUINOT.